United States Patent [19]

Siegrist et al.

[11] Patent Number: 5,297,804
[45] Date of Patent: Mar. 29, 1994

[54] SEALING SYSTEM

[75] Inventors: Uwe Siegrist, Ottrau; Edgar Freitag, Schwalmstadt, both of Fed. Rep. of Germany

[73] Assignee: Firma Carl Freudenberg, Weinheim, Fed. Rep. of Germany

[21] Appl. No.: 55,932

[22] Filed: Apr. 30, 1993

Related U.S. Application Data

[63] Continuation of Ser. No. 909,905, Jul. 7, 1992, abandoned.

[30] Foreign Application Priority Data

Nov. 14, 1991 [DE] Fed. Rep. of Germany ....... 4137461

[51] Int. Cl.$^5$ ............................................. F16J 15/16
[52] U.S. Cl. ...................................... 277/25; 277/174; 494/38; 494/70
[58] Field of Search .................... 277/13, 14 R, 25, 27, 277/31, 174; 494/38, 70, 72

[56] References Cited

U.S. PATENT DOCUMENTS

| | | | |
|---|---|---|---|
| 3,743,303 | 7/1973 | Pope | 277/27 |
| 4,069,969 | 1/1978 | Tanaka | 494/70 |
| 4,284,233 | 8/1981 | Kulker | 494/38 |
| 4,289,264 | 9/1981 | Rawlins | 277/27 |
| 4,403,779 | 9/1983 | Wilkinson | 277/27 |
| 4,695,270 | 9/1987 | Zettier | 494/70 |
| 4,890,849 | 1/1990 | Eason | 277/27 |
| 5,029,880 | 7/1991 | Johansson | 277/174 |
| 5,050,892 | 9/1991 | Kawai et al. | 277/27 |

OTHER PUBLICATIONS

Heinz Hemfort, *Separators* (booklet), pp. 33 and 34, 1983.

*Primary Examiner*—William A. Cuchlinski, Jr.
*Assistant Examiner*—Daniel DePumpo
*Attorney, Agent, or Firm*—Sprung Horn Kramer & Woods

[57] ABSTRACT

A sealing system for a circumferential gap between an inner component and a concentric outer component. The inner component moves in relation to the outer component essentially only linearly back and forth. The two components rotate together around a common axis. There is a groove around the inner component. A centrifugal seal is secured in the groove by axial resilience. An axial lip around one side of the seal rests against at least one of the groove's sides. There is at least one radial lip along the outer circumference of the seal. The centrifugal force, increasingly exerted on a hydraulic fluid as the rotation of the components accelerates, causes the seal to expand radially as well until the lip or lips along its outer circumference come into contact with the inner surface of the outer component, sealing off the gap. The axial lip and the radial lip define a diagonal plane at an angle of 15° to 75° to the axis of rotation.

7 Claims, 3 Drawing Sheets

SEALING SYSTEM

This application is a continuation of application Ser. No. 909,905, filed Jul. 7, 1992, now abandoned.

BACKGROUND OF THE INVENTION

The present invention concerns a sealing system for a circumferential gap between an inner component and a concentric outer component. The inner component moves in relation to the outer component essentially only linearly back and forth. The two components rotate together around a common axis. There is a groove around the inner component. A centrifugal seal is secured in this groove by axial resilience. An axial lip around one side of the seal rests against at least one of the groove's sides. There is at least one radial lip along the outer circumference of the seal. The centrifugal force, increasingly exerted on a hydraulic fluid as the rotation of the components increases, causes the seal to expand radially as well until the lip or lips along its outer circumference come into contact with the inner surface of the outer component, sealing off the gap.

A system of this type is known. It is employed to seal off the bottom of a centrifuging compartment from the housing of a self-emptying separator. Such a housing has, for example, a radial outlet. The bottom of the compartment moves linearly in and out of the housing and opens and closes the outlet. The in-and-out motion is generated by a fluid. The seal between the bottom of the compartment and the housing must be tight enough to allow the separator to pressurize and operate properly. The cross-section of the centrifugal seal is essentially rectangular or square and rests flat against the inner surface of the outer component and against at least one axial side when the separator is operating properly.

This system has a drawback, however, in that the seal begins to leak after being used for some time, and the inner component becomes difficult to control.

SUMMARY OF THE INVENTION

The principal object of the present invention is to improve a sealing system of the aforesaid type to ensure better operating characteristics over a longer life.

This object, as well as other objects that will be apparent from the following discussion, is attained in accordance with the present invention, in that the axial lip and the radial lip define a diagonal plane at an angle of 15° to 75° and preferably of 30° to 60° to the axis of rotation. The advantage is that the gap between the two concentric components can be sealed by precisely defined areas of the seal. A seal of this type will not tilt. The contact surface is less extensive than with the prior known seals, increasing the specific pressure exerted by the sealing edges against the areas they contact. The seal is accordingly more effective.

The lower wear on the lips of this seal prevents the early leakage characteristic of the prior known seals, and sealing capacity is retained significantly longer.

In one advantageous embodiment of the invention, a backing ring upstream of the lips and on the side remote from the control fluid in the groove in the inner component radially covers at least some of the gap while the components are rotating. The backing ring can be made for example of polytetrafluoroethylene ("Teflon"), which is particularly slippery, definitely improving both the radial relative motion while the system is rotating and the pressure on the seal. The backing ring prevents gap extrusion, extending the life of the seal even more.

Sealing capacity will be even more effective if the seal has two axially adjacent but separated radial lips. The lip facing the fluid can rest with less force than the lip facing away from the control fluid against the inner surface of the outer component while the components are rotating. This feature prevents the fluid from exerting too much pressure between the lips, which could lead to leakage.

Various types of seal can be employed in this system. The seal can be either a solid seal or a lip seal. The advantage of a solid seal is that its properties will remain satisfactory throughout its long life. No relaxation will be observed. The more flexible lip seals allow variable pressure against the adjacent sealing surfaces of the rotating components even at low fluid pressures. The solid seals employed in this system have an essentially rectangular cross-section, while the lip seals will have L-shaped or U-shaped cross-sections.

Spacers can be integrated into the surface of the seal facing the bottom of the groove and can come into contact with the bottom. The advantage is that the control fluid can immediately exert pressure against the base of the groove, when necessary, and a radially outward force will act on the seal while it rotates. Varying the pressure on the fluid will reduce the length of the straight-line motion between the inner and outer components.

A system of this type will preferably be employed to seal off a pressurized rotating drum that moves axially back and forth inside the housing of a self-emptying separator, whereby the housing has at least one radial outlet that can be opened and closed by the axially moving drum. The inner component will in this event be the bottom of a centrifuging compartment radially accommodated inside the housing and rotating along with it around a common axis. The system in accordance with the invention seals the fluid that generates the back-and-forth motion of the bottom of the compartments off from the housing and produces pressure.

The preferred embodiments of the present invention will now be described with reference to the accompanying drawings.

DESCRIPTION OF THE PREFERRED EMBODIMENTS

FIGS. 1 through 4 illustrate a sealing system for a circumferential gap 1 between an inner component 2 and a concentric outer component 3. The inner component moves in relation to the outer component essentially only linearly back and forth (up and down as represented in the figures). The two components rotate together about a common axis 4.

Figure 1:
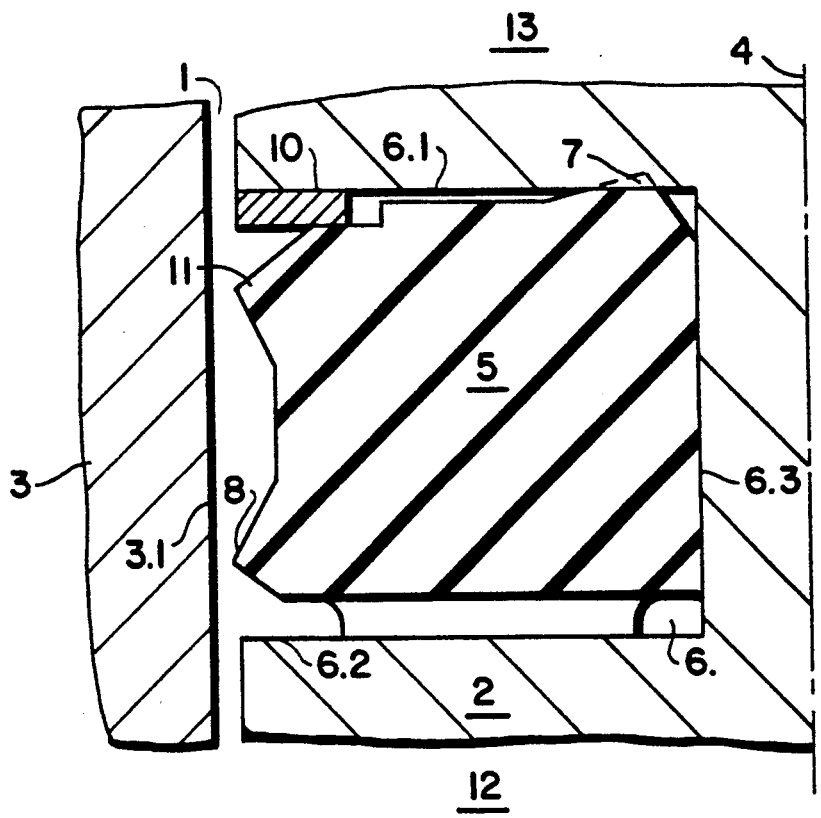
FIG. 1 is a longitudinal cross-sectional view through one side of a sealing system in accordance with a first preferred embodiment of the present invention with the components at rest.

There is a groove 6 around inner component 2. A centrifugal seal 5 is secured in the groove by axial resilience. As long as components 2 and 3 are not rotating, as illustrated in FIG. 1, seal 5 will rest against the bottom 6.3 of groove 6. An axial lip 7 around one side of the seal is forced into the groove with axial excess.

Figure 2:
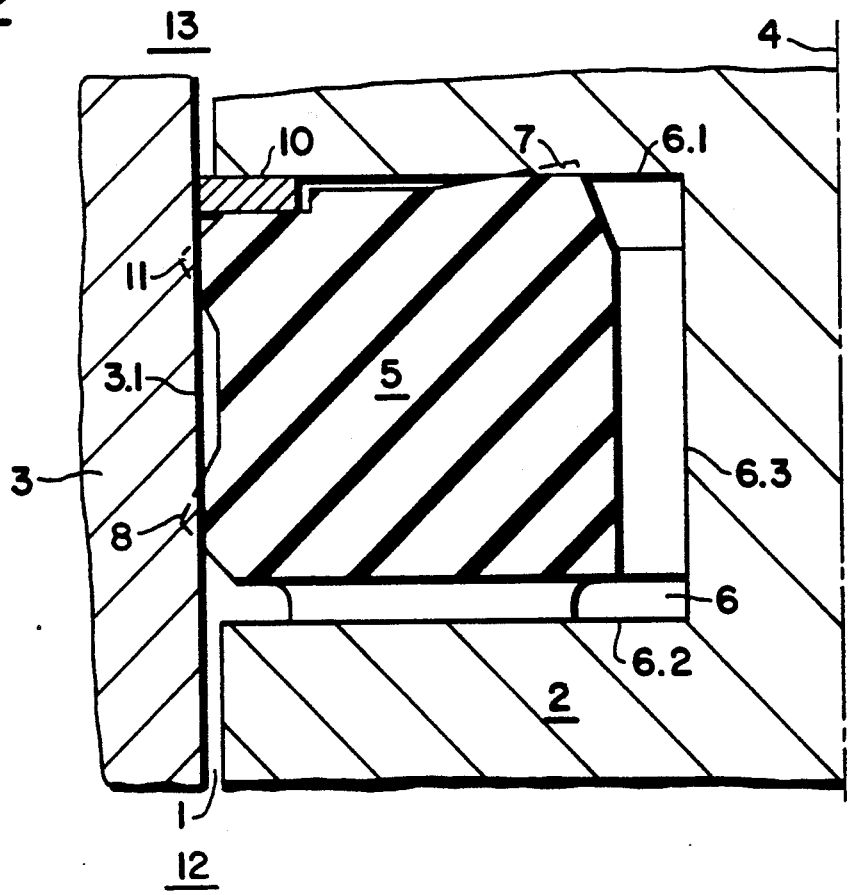
FIG. 2 is a longitudinal cross-sectional view of the sealing system of FIG. 1 with the components in rotation.

Radial lips 8 and 11 are adjacent and separated and do not seal off fluid compartments 12 and 13. As components 2 and 3 rotate more and more rapidly as illustrated in FIG. 2, the seal 5 will stretch and expand outward radially. The radially outward force, which is proportional to the square of the speed, acts on the radial lips 8 and 11 which, in turn, exert a force on the inner surface 3.1 of outer component 3.

The radial lips 8 and 11 in the state illustrated in FIG. 2, in conjunction with axial lip 7, seal off the fluid compartments 12 and 13 from each other. The fluid, which exerts a force on the seal 5 from the fluid compartment 12, presses the radial lips 8 and 11 tighter against the outer component 3. The changing pressure in the fluid compartment 12 produces only a linear motion between components 2 and 3.

The axial limiting surfaces of the groove 6 are indicated in FIGS. 1 and 2 as the surface 6.1, on the side of the fluid compartment 13, and the surface 6.2, on the side of the fluid compartment 12. The surface 6.1 is provided with a backing ring 10, which is preferably made of polytetrafluoroethylene ("Teflon"). As shown in FIG. 2, this backing ring covers at least some of the gap 1 while the components are rotating.

According to the invention, the diagonal plane 9 extending between the axial lip 8 and the radial lip 7 forms an angle α with respect to the axis of rotation 4 in the range of 15° to 75° and, preferably, in the range of 30° to 60°. The angle α illustrated in FIG. 1 is approximately 45°.

If desired, spacers can be integrated into the surface of the seal facing the bottom of the groove 6.3 which come into contact with the groove bottom.

Figure 3:
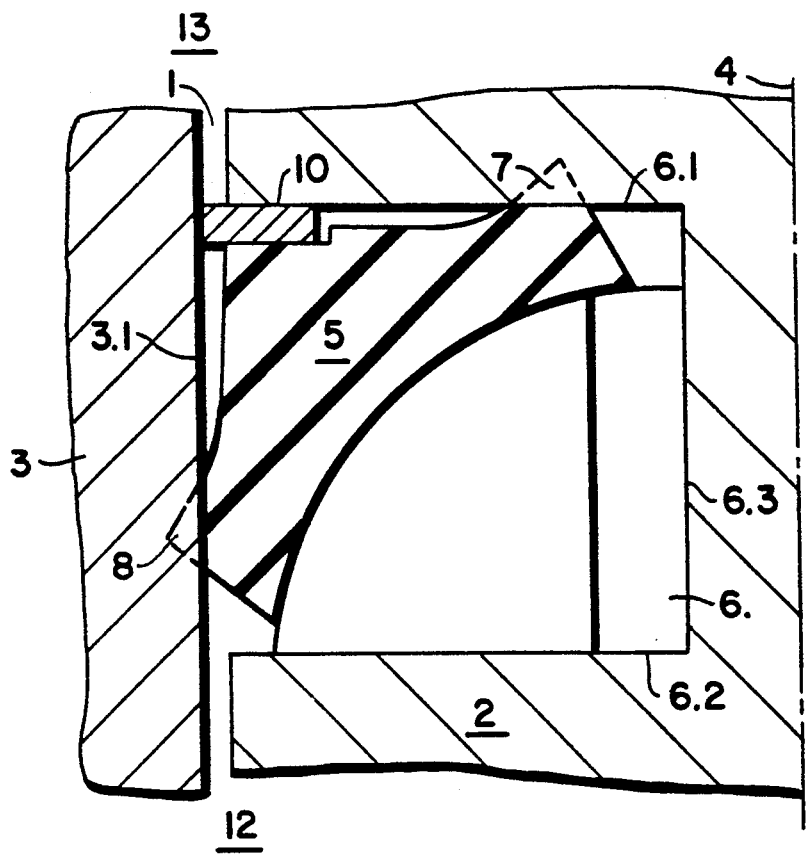
FIG. 3 is a longitudinal cross-sectional view of a sealing system in accordance with a second preferred embodiment of the present invention.
Figure 4:
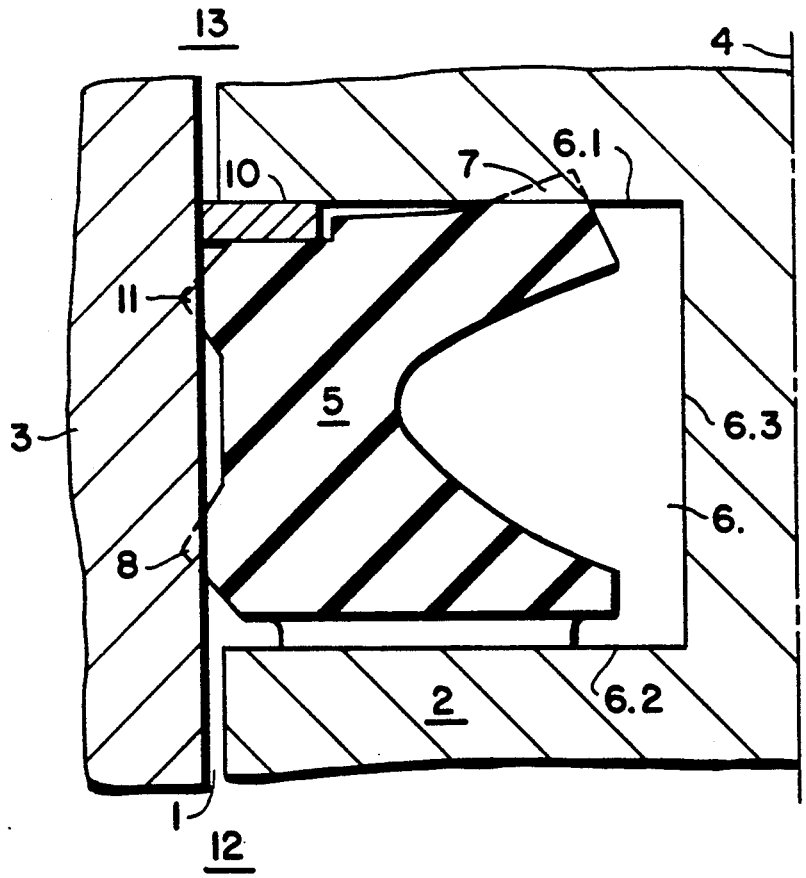
FIG. 4 is a longitudinal cross-sectional view of a sealing system in accordance with a third preferred embodiment of the present invention.

The seal 5, can either be a solid seal as illustrated in FIGS. 1 and 2, or a lip seal, as illustrated in FIGS. 3 and 4.

The systems illustrated in FIGS. 3 and 4 are essentially similar to the system illustrated in FIGS. 1 and 2, although the seal 5 is a lip seal. The seal 5 has a radial lip 8 and an axial lip 7 that together define a diagonal sealing plane at an angle of 45° to the axis of rotation. The pressure in the fluid compartment 12 illustrated in FIGS. 2 through 4 is as high or higher than the pressure in fluid compartment 13. The pressure in the fluid compartment 12 illustrated in FIGS. 3 and 4 acts on the curved inner surface of the seal 5, increasing the pressure of the axial lip 7 and radial lips 8 and 11 on the adjacent sealing areas of components 2 and 3, respectively.

Figure 5:
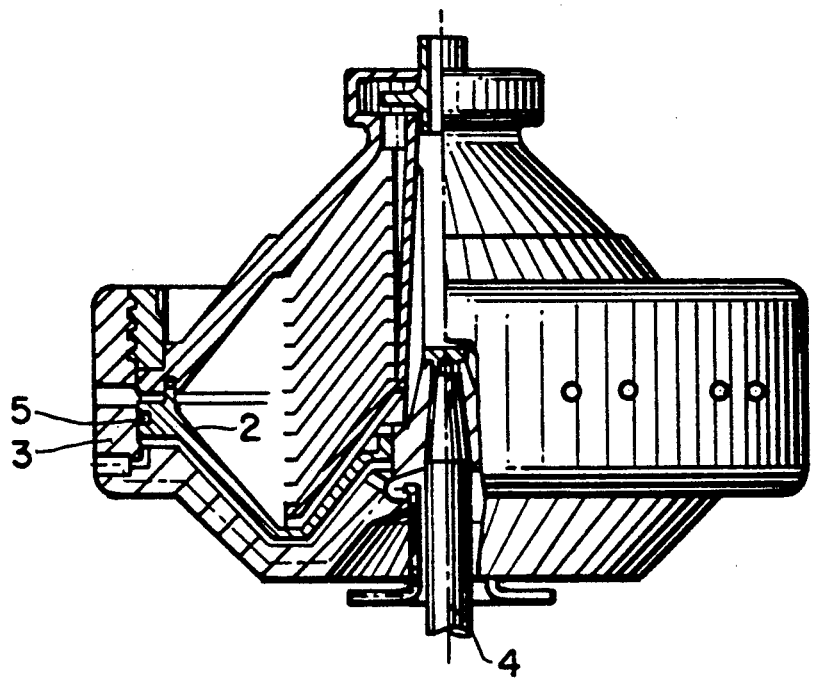
FIG. 5 is an elevational view, partly in cross-section, of a self-emptying separator employing a sealing system in accordance with the invention.

FIG. 5 illustrates a known type of self-emptying separator employing a sealing system in accordance with the invention. Seal 5 is accommodated in a groove in the bottom of the centrifuging compartment and seals the gap 1 between that bottom, which represents inner component 2, and the separator's housing, which represents outer component 3, while the components are rotating. The inner component 2 moves back and forth axially in relation to outer component 3 when charged with fluid and opens and closes the outlet.

There has thus been shown and described a novel sealing system that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. A self-emptying separator comprising: (1) a housing having a circular inner surface; (2) a rotating component having opposite sides and a circumferential edge, said component being arranged to rotate and move axially back and forth inside the housing in response to fluid pressure differential on its opposite sides, there being a circumferential gap between the circumferential edge of the component and the inner surface of the housing, the housing having at least one radial outlet that is opened and closed by the axially moving, component, said component having a circumferential groove around its circumferential edge facing the gap, said groove having two sides and a bottom; and (3) a centrifugal seal secured in the groove by axial resilience, an axial lip around one side of the seal resting against at least one of the groove's sides, there being at least one radial lip along the outer circumference of the seal, the centrifugal force increasingly exerted on a fluid as the rotation of the component increases forcing the seal to expand radially as well until at least one lip along its outer circumference comes into contact with the inner surface of the housing, sealing off the gap, the axial lip and the radial lip defining a diagonal plane at an angle of 15° to 75° to the axis of rotation.

2. The separator defined in claim 1, wherein the axial lip and the radial lip define a diagonal plane at an angle of 30° to 60° to the axis of rotation.

3. The separator defined in claim 1, wherein a backing ring upstream of the lips and on the side remote from the fluid in the groove in the component radially covers at least some of the gap while the component is rotating.

4. The defined in claim 1, wherein the seal has two axially adjacent but separated radial lips.

5. The separator defined in claim 1, wherein the seal is a solid seal.

6. The separator defined in claim 1, wherein the seal is a lip seal.

7. The separator defined in claim 1, wherein spacers are integrated into the surface of the seal facing the bottom of the groove, which spacers can come into contact with the bottom.

* * * * *